United States Patent [19]
Adam et al.

[11] 3,876,779

[45] Apr. 8, 1975

[54] AGENTS EFFECTIVE AS NON-SPECIFIC STIMULANTS FOR ANTITUMORAL IMMUNITY DERIVED FROM MICRO-ORGANISMS OF THE MYCOBACTERIA TYPE AND METHODS FOR THEIR MANUFACTURE

[75] Inventors: Arlette Adam, Palaiseau; Louis Chedid; André Lamensans, both of Paris; Edgard Lederer, Sceaux; Francine Parant, Paris; Monique Parant, Paris; Jean-François Petit, Paris, all of France

[73] Assignee: Carter-Wallace, Inc., New York, N.Y.

[22] Filed: May 17, 1973

[21] Appl. No.: 361,291

[30] Foreign Application Priority Data
May 19, 1972 France .............................. 72.72189

[52] U.S. Cl. ................... 424/195; 424/93; 195/96; 195/2
[51] Int. Cl............................................. A61k 27/00

[58] Field of Search .......... 195/96, 2, 28 R; 424/93, 424/195

[56] References Cited
UNITED STATES PATENTS

| | | | |
|---|---|---|---|
| 3,172,815 | 3/1965 | Fox ........................................ | 195/2 |
| 3,275,610 | 9/1966 | Coty ..................................... | 195/2 |

OTHER PUBLICATIONS
Kanetsuna et al., Journal of General Microbiology, Vol. 70, pp. 209–212 (1972).

*Primary Examiner*—Alvin E. Tanenholtz
*Attorney, Agent, or Firm*—Kevin B. Clarke

[57] ABSTRACT

The method comprises cultivating a strain of microorganisms of the Mycobacteria or Nocardia type, collecting the cells of the cultivated strain, killing said cells, then subjecting the dead cells to extraction treatment with acetone, absolute alcohol and ether, and collecting the solid residue. The cells may also be subjected to extraction treatment with chloroform.

14 Claims, No Drawings

AGENTS EFFECTIVE AS NON-SPECIFIC STIMULANTS FOR ANTITUMORAL IMMUNITY DERIVED FROM MICRO-ORGANISMS OF THE MYCOBACTERIA TYPE AND METHODS FOR THEIR MANUFACTURE

The invention relates to agents effective as non-specific stimulants of anti-tumoral immunity in laboratory animals obtained from micro-organisms of the Mycobacteria or Norcardia type, and to pharmaceutical compositions containing these agents and the method of obtaining them.

It is known that whole mycobacteria cells, and particularly BCG, are endowed with additive properties and capable of inreasing resistance to tumors. However these micro-organisms sensitize the host to the lethal effect of the bacterial endotoxins (lipopolysaccharides) of gram-negative germs. This effect can be the origin of numerous physio-pathological disorders, taken into account the abundant presence of gram-negative germs in the intestinal flora. Besides, BCG, whilst stimulating the reticulo-endothelial system, causes considerable hypertrophy of the lymphoid organs and especially of the spleen. It may be recalled by way of example that it suffices to inject in the mouse 100 $\mu$g of BCG to increase, 14 days later, from 100 to 1000 times the sensitivity of this animal with respect to lipopolysaccharides. This same dose causes an increase of 50% in the weight of the spleen, whilst 300 $\mu$g causes 200 to 400% hypertrophy of this same organ. There exists besides a strict correlation between hyperreactivity to endotoxins and hypertrophy of the reticulo-endothelial system after injection of BCG.

It is an object of the invention to overcome these drawbacks, especially to provide products extracted from these micro-organisms which, whilst possessing immunostimulant action equal or greater than that of the latter, are devoid, at least to a sufficient degree, of the toxicities which have previously limited their usefulness both as active principles for anti-tumoral medicaments as well as a method for obtaining them.

The method according to the invention for preparing a non-specific agent of anti-tumoral immunity is characterised in that a strain of micro-organisms of the Mycobacteria or Nocardia type is cultivated, the cells of the cultivated strain are collected, the said cells are killed, they are then subjected to an extraction treatment with acetone, absolute alcohol and ether, and the solid residue is collected. There is thus obtained a solid residue which already constitutes itself a valuable therapeutic agent.

In a preferred embodiment of the method according to the invention, the abovesaid cells are also preferably subjected to an extraction treatment with chloroform.

The extraction treatment of the killed cells is effected first of all with the acetone, then with a mixture of absolute alcohol and ether and, lastly, with chloroform.

The residue delipidised by the four aboveindicated solvents itself constitutes a valuable therapeutic agent endowed with a high stimulant activity in non-specific manner of anti-tumor immunity, whilst being practically devoid of the undesirable secondary effects which have been recounted above.

There are obtained also particularly interesting products by subjecting the delipidised cells obtained to treatment by which there is produced, especially after extraction with chloroform, rupture of the walls of the delipidised cells. The broken cell walls are collected and treated with one or several proteolytic enzymes and the solid residue collected constitutes the above-said stimulant agent. The agents according to the invention can hence be considered as being constituted by the successive particular products obtained at the end respectively, of each of the following steps (a), (b), (c) and (d) of the method of treatment defined below for micro-organisms coming from Mycobacteria cultures, which method is characterised in that:

a. the cells are killed, the dead cells are collected, especially by filtration and after washing the latter, the dead cells collected are treated to an extraction treatment, first with acetone, then with a mixture absolute alcohol-ether, especially in a volumetric ratio 1:1, and the supernatant liquid is removed and the solid fractions obtained are collected;

b. the abovesaid solid fractions are taken up and treated with chloroform; the supernatant liquid is removed and the solid products essentially constituted by the delipidised cells are collected;

c. the rupture of these delipidised cells is effected; the broken cell walls are collected;

d. the broken cell walls are subjected to the action of proteolytic enzymes, preferably after the addition of DNase in a sufficient amount to enable the destruction of the desoxyribonucleic acids freed by the rupture of the cells, and the solid products obtained are collected.

In preferred embodiments of the method according to the invention, the initial cells are killed by putting them in contact with suitable solutions or solvents, especially a solution of phenol. It is naturally self-evident that any other method known in itself, such as for example heating of these cells in an autoclave, may be envisaged for this purpose.

One category of preferred products, obtained at the end of step (d) of the above-mentioned method, comprises those which result from the treatment of the abovesaid cellular walls by trypsin and/or chymotrypsin, the particular products obtained being in addition if necessary subjected to treatment with proteolytic enzyme, such as that known under the trade name "PRONASE".

In a general way the products obtained at the end of each of the above-mentioned steps are characterised at the same time by anti-tumoral activity as great if not greater with respect to those of the dead or living whole cells from which they are derived, and — at doses where this anti-tumoral activity is fully manifested — by a distinctly reduced toxicity, even total absence of toxicity. In other words the products according to the invention are characterised by a favorable therapeutic index not possessed by living or dead Mycobacteria.

The improvement of the therapeutic index that is observed in the agents according to the invention is all the more remarkable if the treatment of the dead Mycobacteria under the above-indicated conditions and treated with acetone alone leads to products which have either still a distinct toxicity, as the results of tests indicated below show as regards the products extracted from cells of *Mycobacterium tuberculosis*, var. *hominis* or *bovis* (BCG) or *Mycobacterium smegmatis*, or a weak anti-tumoral activity, as has been observed with extracts of *Mycobacterium kansasii* cells.

The agents according to the invention are produced from cells of Mycobacteria or of Nocardia both pathogenic and non-pathogenic.

As examples of Mycobacteria which can be used as raw material for the production of the anti-tumoral immunity stimulating agents according to the invention, there may be mentioned especially:

*Mycobacterium tuberculosis*, variety *hominis* or *bovis*, in particular Bacille Calmette-Guérin (BCG);

*Mycobacterium kansasii*;

*Mycobacterium smegmatis* or other organisms belonging to the Mycobacterium genus.

Other characteristics of the method according to the invention and of the products obtained will also appear in the course of the additional description which follows, relating to an operational protocol, given by way of indication, with examples of the application of this method as well as with results of pharmacological experiments which have been carried out with these products.

According to this preferred operational protocol, the bacteria which have been cultivated, for example on a Sauton medium in a Roux dish, are first killed by placing in the presence of phenol at a final concentration of 2% for 48 hours; this can be done by the addition of an aqueous solution of phenol to a culture which is then kept at ordinary temperature for 48 hours, after which the bacilli are filtered and washed several times with distilled water. It is naturally self-evident that the bacteria used can come from cultures on any other conventional media in this field.

The bacterial cells can also be collected, especially when the bacteria are cultivated in a fermenter, by filtration or centrifugation, then placing them back in suspension, for example with a Potter type grinder with Teflon piston, or by controlled stirring in the presence of large glass balls (having a diameter of 3 to 5 mm) at the ratio of about 50 g by weight of cells per litre, in a 2% phenol solution, keeping them here for 48 hours, collecting them by filtration or centrifugation, then washing them by several repetitions of suspension and filtration or centrifugation.

The cells obtained at the end of these operations then undergo a delipidation treatment by solvents under the following conditions.

The delipidation solvents are used in the following order: acetone, mixture of absolute alcohol-ether in a volumetric ratio of 1:1, chloroform. These delipidations took place at ordinary temperature, by placing back in suspension of the cells in about 30 times their weight of solvent, then agitation with a magnetic stirrer for 24 hours; the cells are then collected by filtration; this operation is repeated 3 times. The cells can also be delipidised under reflux in a Soxhlet or Kumagawa type extractor by means of the abovesaid solvents or mixture of these solvents, the operation being pursued until the extraction by the solvent or the mixture of solvents concerned extracts nothing further, which can be noted by the absence of residue after the evaporation of the one or more solvents which have served for the extraction.

The whole of the lipids extracted by the succession of solvents used represents about 30 to 40% by dry weight of the initial cells. The principal categories of lipids extracted by the acetone are glycerides and, in smaller amount, glycolipids and lipopeptides. The 6,6'-dimicolate of trehalose (cord factor) is extracted in part by acetone, the remainder by the other solvents. The alcohol-ether extracts essentially phospolipids and A waxes. The chloroform extracts B, C and D waxes.

The A, B, C and D waxes are characterised by their solubility in various solvents at various temperatures (see J. Asselineau, Les Lipides Bacterien, Hermann Editeur, Paris 1962).

The preferred agents of the invention can then be considered as delipidised Mycobacteria cells, substantially free of free lipids, especially of glycerides, glycolipids and lipopeptides, of cord factor, of phospholipids and of waxes A, B, C and D.

The delipidised cells obtained at the end of the operations described above can then be used "as is" or be subjected also to further treatments, for rupturing their walls and the latter being, if necessary, subjected in addition to proteolysis, especially under the following conditions.

The cellular walls of the bacteria thus delipidised are prepared by rupture of the cells, treatment by a DNase, then differential centrifugations intended to separate the walls of the unbroken cells and soluble constituents of the cell or constituents of smaller size. This rupture may, for example, be effected by stirring in the presence of small glass beads (0.1 to 0.2 mm diameter), by grinding in the presence of alumina or by ultrasonics or any other method.

The walls are then subjected to proteolytic enzymes, trypsin and chymotrypsin for example, or PRONASE, or any other proteolytic enzyme, the enzymes being usable alone or in admixture and if necessary used successively; these enzymes remove the proteins which could contaminate the walls but also solubilize peptides or proteins belonging to the wall and which represent 20 to 30% by weight of the latter. There are thus finally obtained the particular products corresponding to those of step (d) above-mentioned.

In the foregoing there have been especially described examples of applications of the method according to the invention intended to provide preferred solid products of the invention, namely those which result from the accomplishment of step (b), on one hand, and step (d), on the other hand. It will be self-evident of course that it would also have been possible to stop, in the operational protocol described above, at the ends of steps (a) and (c), such as have been defined above.

In particular, the treatment of delipidation could have been limited to the treatment of extraction of the dead cells by acetone and then by the mixture alcoholether. The delipidised cells thus obtained would thus consequently have again retained substantial amounts of waxes B, C and D.

In the same way, it would have been possible to interrupt the treatment of the delipidised cells after rupture of their walls and to collect the latter, these walls being then themselves capable of constituting the therapeutic agent according to the invention.

There will be also indicated in the following detailed examples of treatments of the types enabling the obtaining of the desired successive fractions in accordance with the invention, applied especially to cells of a *M. kansasii*, P. 21 Runyon strain, as well as intermediate fractions (Examples 1 and 2), which have also been the subject of pharmacological tests which have enabled the establishment, of the particularly favorable results given by the agents according to the invention.

EXAMPLE 1

Preparation of phenolated *M. kansasii* (M.k.) cells.

Cells of *M. kansasii* are cultivated in Roux dishes on a Sauton medium for 39 days at 37°C. They are then killed by the addition of phenol to obtain a final concentration of 2%. The Roux dish is then stirred so that the bacterial pellicle is in its entirety placed in contact with the phenolated medium. After 48 hours at ordinary temperature, the bacterial cells are collected by filtration on a filter paper, on a Buchner funnel, then washed by abundant percolation with distilled water through the cake of bacteria retained on the filter, the latter being then, if necessary, collected as is.

EXAMPLE 2

Preparation of *M. kansasii* cells delipidised by acetone (M.k.a)

The abovesaid cake of bacteria is placed in suspension in acetone (about 30 times the volume of the cake). The acetone suspension is stirred by means of a magnetized bar driven by a magnetic stirrer for 24 hours at ambient temperature. The bacteria are then again collected by filtration on a Buechner and replaced in suspension in fresh acetone then stirred at ordinary temperature. The filtration and delipidation are then repeated a third time. Then the bacterial bodies are dried by evaporation of the residual acetone in free air, then under vacuum. The bacterial bodies thus prepared are then preserved at ambient temperature, sheltered from light.

EXAMPLE 3

Preparation of *M. kansasii* cells delipidised by acetone and the alcohol-ether mixture (M.k.a, ae)

The bacterial bodies of the example are treated with acetone as in Example 2, but instead of being dried they are placed in suspension in the alcohol absolute-ether mixture (in a volumetric ratio of 1:1), stirred for 24 hours at ordinary temperature by magnetic stirring, filtered on a Buchner, the operation being repeated twice more. The cells obtained may then be collected (fraction M.k.a, ae), placed in suspension in acetone, dried and preserved shielded from light.

EXAMPLE 4

Preparation of *M. kansasii* cells delipidised by the "four solvents" (M.k.a, ae, c)

Procedure is as in Example 3, the bacterial bodies, after their treatment by the alcohol-ether mixture under the above-indicated conditions, being subjected to the same treatment with chloroform, this operation being repeated three times. The cells are finally replaced in suspension in acetone, dried and kept sheltered from light, as long as desired.

EXAMPLE 5

Preparation of *M. kansasii* walls treated with trypsin and chymotrypsin (M.k.par.)

The above-mentioned delipidised cell walls are replaced in suspension in water in proportion of 25 ml of water for 1 gram of delipidised cells by means of a grinder of the Potter type with a teflon piston then subjected, by frations of 30 ml, for 25 minutes (5 times 5 minutes) to ultrasonics emitted by an apparatus of 250 W, 10kHz, cooled by circulation of water. This operation destroys the integrity of the envelope of the majority of the bacteria and the walls can be collected by differential centrifugation. After the addition of DNase (0.1 mg per 100 ml of suspension) for the purpose of destroying the desoxyribonucleic acids freed by the rupture of the cells, the intact cells are removed by three sucessive centrifugations at 200 g for 10 minutes in a refrigerated centrifuge. The last supernatant liqueur is centrifuged for 1 hour at 27,500 g. The culots constituted essentially of the walls, are then replaced in suspension with a Potter type grinder with a Teflon piston in 50 times their volume of 0.066 M phosphate buffer, pH 7.8, containing 0.3% of trypsin and of chymotrypsin and incubated overnight at ambient temperature after the addition of some drops of toluene.

The walls purified by the action of the enzymes are then collected by centrifugation of 1 hour at 27,500 g, replaced in suspension in the previously described phosphate buffer, recentrifuged. The latter operation, for removing the proteolytic enzymes and the substances which may have solubilized is repeated twice with the phosphate buffer and three times with distilled water. The walls thus washed are then replaced in suspension in as small a volume of acetone as possible. The walls are collected by filtration on a No. 4 sintered glass filter and dried in air then under vacuum. After grinding in the mortar, the product obtained (M.k.par.) can be preserved as long as desired at ordinary temperature, sheltered from light.

Analysis of the particular product thus obtained is as follows:

Elemental analysis

C = 51.93%; H : 8.01%; N : 4.08%

Composition

Aminoacids: 12.5% : Alanine, glutamic acid, meso-$\beta,\epsilon$-diamino-pimelic acid, in a ratio of 1:1:0.6, plus aspartic acid, glycocol, threonine, serine, valine, leucine, isoleucine and phenylalanine in a lower ratio than 0.3 with respect to the glutamic acid.

Amino sugars: 10% : glucosamine, N-acetylated before hydrolysis, and muramic acid, N-glycolylated before hydrolysis, in a ratio of 1:1

Neutral sugars: 38% : arabinose, galactose and glucose

Lipids : 30 to 40% : more than 90% of these lipids are kansamycolic acids.

EXAMPLE 6

Preparation of the walls of *M. kansasii* treated with trypsin, with chymotrypsin and with pronase (M.k.par.pr.)

500 mg of walls derived from delipidised *M. kansasii* cells and which have been treated with trypsin and chymotrypsin, like in the preceding example, are placed in suspension by means of a Potter grinder with a teflon piston in 100 ml of 0.02 M, pH 7.8 sodium phosphate buffer, then supplemented with 50 mg of pronase P and incubated for 8 hours at 37°C in the presence of some drops of toluene. They are collected by centrifugation for 1 hour at 27,500 g then washed by being replaced in suspension and centrifugation three times with a sodium phosphate buffer 0.02 M pH 7.8 then three times with water. They are then delipidised by being placed in suspension in a Potter grinder in 30 times their volume of solvent, stirring for 24 hours at ordinary temperature with a magnetic stirrer then filtration on sintered glass No. 4. This operation is carried twice with acetone, twice with the mixture alcohol-ether and twice with chloroform. The walls are then restored into suspension in acetone, filtered again, then dried in air and kept at ordinary temperature sheltered from light.

EXAMPLE 7

There were obtained by the same treatments as in Examples 1 to 5 successive extracts from cells of the strains:

*Mycobacterium tuberculosis* var *bovis:* bacille Calmette-Guérin (BCG), Pasteur Institute strain;

*Mycobacterium smegmatis*, strain deposited in the "American Type Culture Collection" under No. 21732.

PHARMACOLOGICAL PROPERTIES OF THE AGENTS ACCORDING TO THE INVENTION

The agents according to the invention, obtained in the above-described manner, are devoid, at the doses at which they are capable of being used, from the serious drawbacks of whole mycobacterial cells (particularly hyperreactivity to endotoxins and hypertrophy of the reticuloendothelial system) which limits the use of the Mycobacteria in therapeutics, whilst showing a strong anti-tumoral action. These favorable qualities are established by the pharmacological tests described below. The list which follows relates to the products which have been tested as well as the designations which will be retained hereafter.

BCG killed with phenol (BCG);

BCG killed with phenol and delipidised with acetone (BCG a);

BCG killed with phenol, delipidised with acetone, with alcohol-ether and with chloroform (BCG a, ae, c);

M. *smegmatis* killed with phenol (M. sm.)

M. *smegmatis* killed with phenol and delipidised with acetone (M. sm. a);

M. *kansasii* killed with phenol (M.k.)

M. *kansasii* killed with phenol and delipidised with acetone (M.k. a);

M. *kansasii* killed with phenol, delipidised with acetone and alcohol-ether (M.k a, ae)

M. *kansasii* killed with phenol, delipidised with acetone, with alcohol-ether and with chloroform (M.k a, ae,c)

M. *kansasii*, germ walls delipidised and treated with trypsin and chymotrypsin (M.k par.)

M. *kansasii*, preceding walls treated with PRONASE (M.k par. pr.).

The tests used were the following:

sensitization of the mouse to endotoxins;

hypertrophy of the spleen and of the liver of the mouse, 14 days after the injection of the mycobacterial preparations;

effects of these preparations on lymphoid leucemia grafted on the mouse or on Ehrlich ascitic carcinoma.

In certain cases, the tuberculin reaction was measured in the Guinea-pig and the pyrogenic effect in the rabbit.

With the exception of the tests bearing on the sensitization to histamin, all the experiments done on the mouse were effected by using $F_1$ hybrids produced from cosanguin strains and whose physiological responses are consequently more homogeneous. The results selected to figure in Tables I to III and V and VIII represent more than 5,000 mice.

A - ESTABLISHMENT OF THE INOCUITY OF THE SUBSTANCES OF MYCOBACTERIAL ORIGIN ACCORDING TO THE INVENTION

I - Hyperreactivity of the mouse to endotoxins: comparison between the activities of killed mycobacteria and of the agents according to the invention It is well established that the Mycobacteria increase the susceptibility to the lethal effect of endotoxins (Suster et coll., 1958, Proc. Soc. Exp. Biol. Med., 1958, 99, 167); (Halpern, B.N., C.R. Soc. Biol. Paris, 1958, 152, 899). It has been agreed that this action is connected with the "Cord Factor" (E. Suter et Coll., Proc. Soc. Exp. Biol. Med., 1958, 99, 1967).

In the experiments which follow, the mice used were hybrids (C57B1/6 X AKR)$F_1$, aged from about six weeks. The proof of toxicity is done by injecting in the mice an endotoxin extracted from *Salmonella enteriditis* at doses increasing in the geometric ratio 3 and varying from 0.5 to 150 µg, certain mice having even received 300 µg of this endotoxin. All the injections were done by the intravenous route, the mortalities were checked 48 hours later and the $LD_{50}$ evaluated by the method of Reed and Muench (Amer. J. of Hyg. 1938, 27, 493). It is known that the $LD_{50}$ in the normal mouse is 230 µg (see Table II).

There is shown in Table I below the lethal doses 50 observed in mice treated 8 days previously (J-8) and 14 days previously (J-14) with doses of BCG killed in phenol (BCG) indicated in the first column of Table I.

Table I

Hyperreactivity to endotoxins of the mouse treated with BCG

| Doses BCG i.v. | J — 8 | | | J — 14 | | |
|---|---|---|---|---|---|---|
| | Number of animals | Number of experiments | $LD_{50}$ (µg) | Number of animals | Number of experiments | $LD_{50}$ (µg) |
| 100 µg | 32 | 1 | 56 | 59 | 2 | <1.5 |
| 300 µg | 548 | 14 | <4.3 | 938 | 22 | <1.4 |
| 1 mg | 30 | 1 | <5 | 32 | 1 | 1.5 |

As seen in Table I, 8 days after the injection of BCG the mice became sensitive. The $LD_{50}$s are less than 4.3 µg and equal to 56 µg in mice treated with respectively 300 µg and 100 µg of BCG. Sensitivity is even greater 14 days later. The $LD_{50}$s are less than 1.5 µg for the two before-mentioned doses of BCG.

For all these reasons, in the experiments which follow, the animals were tested 14 days after the injection of BCG or of the experimental mycobacterial preparations. The products were administered in suspension, either in an 8.5% solution of sodium chloride (isotonic solution), or in an oil emulsion known under the name Bayol F in water: in a volume of 0.2 ml of an emulsion of Bayol F in water at 10% for doses of 300 µg and at 3% for doses of 100 µg of the mycobacterial preparations used. In the following reference is often made to suspensions of the products tested in "Bayol" for convenience of language. It relates however in all cases to suspensions in emulsions of Bayol in water, in the above-indicated relative proportions.

The results shown in Table II represent the cumulative means of several experiments.

It is noted that:

In the normal mouse, the $LD_{50}$ is about 230 µg and that, if it has received an injection of Bayol, no death is observed at the highest dose used, that is to say 50 µg. Of three strains killed with phenol used, BCG is that which sensitizes the most and M. *smegmatis* that which sensitizes least. Nonetheless the addition of Bayol to 300 μg of M. smegmatis causes the $LD_{50}$ to pass from 41.4 to a value below 2 μg.

For M.k. par. in suspension in Bayol and administered at the rate of 300 μg, the resistance to endotoxins is reduced. It will be recalled however, as will be seen Table II Hyperreactivity to endotoxins
Comparison between BCG and the other mycobacterial products

| Mycobacteria | Products injected Doses | Excipient | Number of animals | Number of experiments | $LD_{50}$ |
|---|---|---|---|---|---|
| | | Sol. isot. | 62 | 3 | 230 |
| | | Bayol | 21 | 2 | >50 |
| BCG | 100 μg | Sol. isot. | 59 | 2 | <1.5 |
| | 300 μg | | 938 | 22 | <1.4 |
| | 1 mg | | 32 | 1 | 1.5 |
| BCG a | 300 μg | Sol. isot. | 59 | 3 | 26 |
| | 300 μg | Bayol | 87 | 3 | 9 |
| BCG a, ae, c | 300 μg | Sol. isot. | 24 | 1 | >50 |
| M.sm. | 300 μg | Sol. isot. | 92 | 3 | 41.4 |
| | 300 μg | Bayol | 72 | 2 | <2 |
| M.sm. a | 300 μg | Sol. isot. | 118 | 4 | >39 |
| M.k. | 1 mg | Sol. isot. | 26 | 1 | 2.9 |
| M.k. a | 300 μg | Sol. isot. | 87 | 3 | >135 |
| | 1 mg | | 31 | 1 | 6 |
| M.k. a, ae, c | 100 μg | Sol. isot. | 27 | 1 | >300 |
| | 300 μg | | 80 | 3 | 290 |
| | 100 μg | Bayol | 46 | 1 | 180 |
| M.k. par. | 100 μg | | 27 | 1 | >300 |
| | 300 μg | Sol. isot. | 160 | 5 | 140 |
| | 1 mg | | 7 | 1 | < 50 |
| | 100 μg | Bayol | 58 | 2 | 240 |
| | 300 μg | | 58 | 2 | 2.1 |
| M.k. par. pr | 300 μg | Sol. isot. | 21 | 1 | >50 |

The cells delipidised with acetone (BCG a, M.sm. a, M.k a) sensitize the mouse less. Thus BCG a is less toxic than the original BCG and the toxicity of the M.k a is less than that of BCG.

It is remarkable to note that after treatment with several solvents, these same cells (M.k. a, ae; M.k. a, ae, c BCG a, ae, c) do not sensitize to endotoxins. Their sensitizing effect is at least 200 times less than that of BCG, at doses of 100 and 300 μg respectively.

It is the same for the walls, especially of M. kansasii, in the midst of an isotonic solution.

It must be noted that in the case of the latter preparations of M.k, the addition of Bayol to 100 μg of product causes sensitivity to endotoxins very much less than that which is consequent upon the injection of 100 μg of BCG.

below, the emulsion of walls in Bayol reinforces their anti-tumoral activity at doses equal or less than 100 μg.

II - Hypertrophy of the liver and of the kidney: comparison between BCG and the agents according to the invention It is well established that injected by the intravenous route, the Mycobacteria produce a hypertrophy of the liver and especially of the spleen measurable by increase in the weight of these organs, 8 or 14 days after the injection.

In these experiments, the same hybrid mice were used. The products (placed in suspension in isotonic solution and, in certain cases, Bayol at 3 ro 10%) were injected by the intravenous route at doses of 100 or 300 μg, to mice which were to be sacrificed 14 days later.

Table III

Hypertrophy of the liver and of the spleen
Comparison between BCG and the other mycobacterial products

| Mycobacteria | Products injected Doses | Excipient | Number of animals | Number exp. | Bodies in g | Liver in g | Spleen in g | % increase in the spleen |
|---|---|---|---|---|---|---|---|---|
| | | sol.isot. | 48 | 7 | 23.3 | 1290 | 117 | |
| | | Bayol | 32 | 4 | 22.4 | | | |

Table III —Continued

Hypertrophy of the liver and of the spleen
Comparison between BCG and the other mycobacterial products

| Products injected Myco-bacteria | Doses | Excipient | Number of animals | Number exp. | Bodies in g | Liver in g | Spleen in g | % increase in the spleen |
|---|---|---|---|---|---|---|---|---|
| BCG | 100 µg | sol.isot. | 7 | 1 | 20.5 | 1275 | 170 | 45.5 |
|  | 300 µg |  | 42 | 6 | 22.3 | 2067 | 350 | 200 |
|  | 1 mg |  | 22 | 4 | 20.9 | 2216 | 453 | 279 |
| BCG a | 300 µg |  | 25 | 3 | 22.6 | 1495 | 171 | 46 |
|  | 1 mg | sol.isot. | 15 | 2 | 23 | 1699 | 246 | 110 |
|  | 100 µg |  | 7 | 1 | 19.7 | 1119 | 139 | 19 |
|  | 300 µg | sol.isot. | 6 | 1 | 18.5 | 1215 | 194 | 66 |
|  | 1 mg |  | 6 | 1 | 19.9 | 1435 | 237 | 102 |
| M.sm. |  |  |  |  |  |  |  |  |
|  | 100 µg | Bayol | 8 | 1 | 20 | 1092 | 156 | 4.8* |
|  | 300 µg |  | 18 | 2 | 20.5 | 1867 | 383 | 157* |
| M.k. | 300 µg | sol.isot. | 25 | 3 | 22.7 | 1210 | 179 | 53 |
|  | 1 mg |  | 10 | 2 | 24 | 1394 | 186 | 59 |
| M.k. a | 300 µg | sol. isot. | 25 | 4 | 23.7 | 1236 | 117 | 0 |
|  | 1 mg |  | 10 | 2 | 20.5 | 1234 | 183 | 56 |
| M.k. a, ae | 300 µg | sol. isot | 5 | 1 | 25.6 | 1282 | 95 | 0 |
|  | 1 µg |  | 5 | 1 | 26.9 | 1426 | 146 | 25 |
|  | 100 µg |  | 10 | 1 | 24.3 | 1169 | 119 | 2 |
|  | 300 µg | sol.isot. | 15 | 2 | 24 | 1109 | 137 | 17 |
| M.k. a, ae, c | 1 mg | | 10 | 1 | 23.8 | 1379 | 191 | 63 |
|  | 100 µg | Bayol | 10 | 1 | 24.5 | 1287 | 159 | 6.8* |
|  | 300 µg |  | 10 | 1 | 23.6 | 1338 | 191 | 28* |
|  | 100 µg |  | 10 | 1 | 23.6 | 1129 | 133 | 13.8 |
|  | 300 µg | sol.isot. | 20 | 3 | 25 | 1333 | 148 | 26.5 |
|  | 1 mg |  | 20 | 3 | 24.2 | 1433 | 149 | 27.2 |
| M.k. par. |  |  |  |  |  |  |  |  |
|  | 100 µg | Bayol | 10 | 1 | 24.2 | 1432 | 200 | 34.1* |
|  | 300 µg |  | 15 | 2 | 24.8 | 1670 | 228 | 53* |

*The percentages of increase concerned were established by ratio with controls which only received Bayol.

Table III represents the averages of several experiments bearing on 5 or 10 animals for each case and each dose. As can be seen, the delipidised cells, especially those which have been treated with the "four solvents", and the walls, even when the latter are suspended in Bayol, causes a hypertrophy much weaker than that which is produced by BCG.

III - Sensitivity to tuberculin

Guinea-pigs are sensitized by subcutaneous injections either of complete Freund additive (ACF) or of incomplete Freund additive containing BCG, M.sm. or M.k. (whole cells killed with phenol).

The sensitivity of these Guinea-pigs is measured 21 days later by injecting them by the intradermal route either with tuberculin (100 or 300 u.i.) or different mycobacterial preparations (10, 30 or 100 µg). It is noted that the cells delipidised by solvents or the walls induce reactions much weaker than whole cells or complete Freund additive.

IV - Pyrogenic power

It is known that numerous bacteria are capable of raising the temperature in the rabbit at infinitesimal doses. For example it suffices to inject 1/100 of a µg of endotoxin to obtain a significant and constant response in the animal. Under these conditions, the walls administered at 5 µg are shown to be devoid of pyrogenic activity and, at 100 µg, caused a reaction showing that they were at least 10,000 times less pyrogenic than an endotoxin extracted from Escherichia coli.

V - Sensitivity to histamine

It is well established that the suprarenalectomised animal as well as the animal treated with Bordetella pertussis becomes less sensitive to endotoxins and to histamine. Adlam, Broughton and Scott have shown that a strain of Corynebacterium parvum which possesses an adjuvant activity and which is capable of increasing the resistance of the animals to tumors, to parasitic or bacterial infections, sensitizes the mouse to histamine (Nature New Biology, 1972, 235, 219). This reduction in resistance is very distinct 7 days after the injection of the bacteria, which represents a major drawback in therapeutics. Munoz and Suter (Proc. Soc. exp. Biol. Med., 1963, 114, 211) have shown that contrary to what is observed with B. pertussis BCG does not sensitize to histamine and to passive anaphylactic shock. It has been proved that this favorable property is preserved in the mycobacterial preparations according to the invention by proceeding as follows.

Increasing doses of histamines are administered to groups of 8 or 10 mice of a Swiss breed which have been respectively treated 7 days before (J-7) with doses of 1 mg of BCG and mycobacterial preparations seen in Table IV below. All the injections were done by the intravenous route. Normal controls were treated, as Table IV

| Treatment |  | 0.25 | 0.5 | Doses of histamine (mg) 1 | 2 | 4 | 8 | 16 | LD$_{50}$ (mg) |
|---|---|---|---|---|---|---|---|---|---|
| Normal controls |  |  |  |  |  | 0/8 | 3/8 | 8/8 | 9.2 |
| Suprarenalectomised mice |  | 5/8 | 12/15 | 13/15 | 7/8 |  |  |  | 0.3 |
| BCG | 1mg iv |  |  | 0/10 | 0/18 | 0/6 | 1/5 |  | >8 |
| BCG a, ae, c | 1mg iv |  |  |  |  | 0/8 | 4/7 | 7/7 | 7.4 |
| M.sm.a, ae, c | 1mg iv |  |  |  |  | 1/8 | 1/8 | 8/8 | 10 |
| M.k.a., ae, c | 1mg iv |  |  | 0/10 | 0/9 | 0/8 | 0/8 | 7/8 | 13 |
| M.k. par. | 1mg iv |  |  | 0/10 | 0/10 | 0/6 | 2/6 | 6/6 | 9.2 | well as a group of suprarenalectomised mice 48 hours before the test injection, under the same conditions. As is seen in Table IV the mice which have received mycobacterial preparations according to the invention have not become more sensitive to histamine, whilst after suprarenalectomy the $LD_{50}$ is modified by more than 30 times. There is indicated in the Table the ratio of the number of mice which died to the total number of mice of each group, for each dose of histamine.

B - ESTABLISHMENT OF THE ANTITUMORAL ACTIVITY OF THE SUBSTANCES ACCORDING TO THE INVENTION

It is well known that the Mycobacteria stimulate the resistance of the organism with respect to grafted tumors such as lymphoid leucemia of the mouse and ascitic carcinoma of Ehrlich.

The experiments which follow show the activity of the different preparations of Mycobacteria against a lymphoid leucemia and Ehrlich carcinoma.

I - Experimental lymphoid leucemia

The antitumoral activity was evaluated on a grafted lymphoid leucemia by the intraperitoneal route on the hybrid F1 (C57B1/6 X AKR). This leucemia occurring spontaneously in one of these hybrids is isogenic in the latter and is not transmissible to other strains of mice including the parental strains. The experiments described in the following were therefore carried out under particularly severe conditions, so that the results which will be described can be considered as particularly significant. In these experiments, the animals were treated by receiving by the intraperitoneal route (in a single injection) variable doses of mycobacterial products, 8 days before the inoculation of $2.10^2$ splenic cells coming from animals having leucemia. The numbers of surviving mice were noted for 60 days. In certain cases, the animals were observed for several months, showing that those which survived 60 days were definitely protected.

There is shown in Table V below in the first column the day (J 50%) where 50% of the mice were dead, in the second column the average survival of the treated animals by attributing the duration of 60 days to those of the living animals at the end of the experiment, in the third column the number of survivors at the sixtieth day after graft, and in the fourth column the differences between the day and the first death and the day and the last death observed among the mice which have not survived at least 60 days.

The Table indicates that the bacterial products resulting from the treatment of killed Mycobacteria, especially *Mycobacterium kansasii*, have an activity at least of the same order of magnitude as those of whole cells, so that they are characterised by a distinctly greater therapeutic index, taking into account important differences discussed above between the toxicities of the agents according to the invention and those of the dead whole cells.

It is the same with the walls derived from the bacterial products resulting from the treatment of whole cells treated with the "four solvents" under the conditions described above. It is observed in particular that these walls, which correspond to a more purified product, have not lost their antitumoral activity in the aqueous phase. This activity is however considerably reinforced if these same walls are administered in suspension in Bayol (the latter injected alone to controls being devoid of any activity). It is deduced that the maximum activity is observed at doses of 100 g, doses at which these walls are shown as practically devoid of toxicity as has been seen above.

II - Action of ascites form of Ehrlich carcinoma

The study was carried out on hybrid mice $F_1$ (C57B1/6 X AKR) of the same sex, aged from about 8 weeks. The strain of Ehrlich carcinoma was maintained by weekly passage in the hybrids. The inoculations were carried out by the intraperitoneal route at the dosage of $10^5$ cells in a volume of 0.5 ml. The treatments were done by this same route, the fourteenth day before the inoculation. However, in some cases, the treatment was carried out on the eighth day before the Table V

| | Protection against grafted lymphoid leucemia in the mouse | | | |
|---|---|---|---|---|
| | J 50% | Average survival | Survivals > 60 days | Deviations |
| Controls | | 25 | 25.4 | 1/58 | 21–30 |
| Controlled Bayol | 24 | 23.7 | 0/7 | 16–29 |
| | 10 μg | 35 | >40.8 | 7/26 | 22–46 |
| BCG | 30 μg | 51 | 46.2 | 21/49 | 21–53 |
| | 100 μg | 42 | 44.4 | 16/48 | 23–53 |
| | 300 μg | 51 | 46.5 | 12/28 | 26–60 |
| | 30 μg | 37 | >46.3 | 5/10 | 25–37 |
| M.sm. | 100 μg | 34 | >43.1 | 3/10 | 30–50 |
| | 300 μg | 31 | >36.1 | 1/10 | 26–48 |
| | 100 μg | >60 | >54.8 | 8/10 | 32–36 |
| M.k. | 300 μg | 48 | >45.3 | 3/9 | 23–50 |
| | 1 mg | 54 | >47.4 | 4/9 | 32–54 |
| | 10 μg | 29 | >34.7 | 4/20 | 24–34 |
| | 30 μg | 30 | >35.7 | 3/20 | 25–48 |
| M.sm. a | 100 μg | 39 | >44.1 | 8/20 | 25–51 |
| | 300 μg | 44 | >42.5 | 1/10 | 32–46 |
| M.k. a, ae, c | 10 μg | 27 | >38.6 | 1/10 | 24–58 |
| | 30 μg | 44 | >50.6 | 5/10 | 32–44 |
| | 100 μg | >60 | >53.6 | 8/10 | 27–29 |
| | 10 μg | 28 | 29 | 0/10 | 22–41 |
| | 30 μg | 29 | >33.1 | 3/20 | 24–36 |
| M.k. par. | 100 μg | 33 | >34.2 | 2/20 | 22–42 |
| | 300 μg | 29 | >31.7 | 2/20 | 22–41 |
| M.k. par. | 30 μg | >60 | >52.1 | 6/10 | 31–44 |
| Bayol* | 100 μg | >60 | >57 | 9/10 | 30 |
| | 300 μg | 40 | >45.4 | 4/10 | 28–41 |

*In all the other cases, the products were placed in suspension in isotonic solution.

inoculation. Each group comprised ten animals.

As for the experimental leucemia, the experiments were stopped 60 days after the inoculation and the same criteria were used.

The results obtained with the various bacterial products are indicated in Tables VI, VII and VII which follow.

In Tables VI and VII are shown the results obtained with dead whole cells (BCG, M.sm., M.k.) as well as with the solid products resulting from the treatment of these dead cells with acetone.

Table VI

|          |         | J 50% | Average duration of survival | Survivals >60 days | % of survivors |
|----------|---------|-------|------------------------------|---------------------|----------------|
| Controls |         | 18    | >21.1                        | 1/40                | 2.5            |
|          | 10 μg   | >60   | >50.5                        | 7/10                | 70             |
|          | 30 μg   | >58   | >52.8                        | 13/20               | 65             |
| BCG      | 100 μg  | >57   | >48.7                        | 16/30               | 53.3           |
|          | 200 μg  | >60   | >54.1                        | 16/20               | 60             |
|          | 30 μg   | 44    | >46.3                        | 4/10                | 40             |
| M.sm.    | 100 μg  | 50    | >52                          | 4/10                | 40             |
|          | 300 μg  | >60   | >52.3                        | 6/10                | 60             |
|          | 10 μg   | >55   | >49.9                        | 12/20               | 60             |
|          | 30 μg   | >60   | >54.8                        | 19/30               | 63.3           |
| M.sm. a  | 100μg   | >60   | >55.7                        | 12/20               | 60             |
|          | 300 μg  | >60   | >57.7                        | 14/20               | 70             |

Table VII

|          | Doses   | J 50% | Average duration of survival | Survivals >60 days | % of survivors |
|----------|---------|-------|------------------------------|---------------------|----------------|
| Controls |         | 17    | 18.7                         | 0/38                | 0              |
| BCG      | 100 μg  | 50    | >47.6                        | 5/19                | 26.3           |
|          | 300 μg  | 49    | >49.9                        | 16/39               | 41             |
|          | 300 μg  | 40    | >40.5                        | 2/8                 | 25             |
| BCG a    | 1 mg    | >60   | >52.7                        | 4/7                 | 57.1           |
| M.k.     | 400 μg  | 31    | >35.6                        | 5/39                | 12.8           |
|          | 1 mg    | 32    | 30                           | 0/27                | 0              |
|          | 100 μg  | 35    | >37.2                        | 1/9                 | 11.1           |
| M.k. a   | 300 μg  | 35    | >37.5                        | 3/18                | 16.6           |
|          | 1 mg    | 43    | >46.5                        | 11/37               | 29.7           |

Tests with dead whole cells cause the appearance of good antitumoral activity for BCG and M.sm., and a distinctly less activity for M.k at least at the doses used. The products treated with acetone show an activity a little improved compared with that of the germs not treated with acetone. This is in particular the case for the bacterial products obtained from *Mycobacterium kansasii*. The dead cells are of little activity. The cells treated with acetone give results a little better, which remain however still rather weak.

Table VIII shows on the contrary the very great activity of the germs treated by the "four solvents" in aqueous phase, and this even at extremely reduced doses. It is interesting in this respect to compare the results obtained with the products derived from *Mycobacterium kansasii*. At doses of 300 μg, the dead bacterial bodies (M.k) only give 12.8% of survivors and the bacterial bodies washed with acetone only give 16.6 % of survivors in animalsl which have not been inoculated 60 days previously with tumoral cells of Ehrlich ascites. On the contrary, 80% of the animals inoculated under the same conditions survive at the end of 60 days, when they have been treated previously by M.k a, ae, c.

In the same way, the walls of M.k preserve their activity in the aqueous phase. The latter is however distinctly reinforced in the presence of Bayol, as seen in Table VIII. At doses of 100 μg, there is obtained 72.2% of survivors among the animals previously inoculated with the abovesaid tumoral cells.

C - COMPARISON BETWEEN THE ANTITUMORAL ACTIVITY AND THE TOXICITY OF THE VARIOUS MYCOBACTERIAL PREPARATIONS TESTED

The various experimental results which have been shown above demonstrate important and unexpected modifications of the behavior of the product and the abstracts obtained at the end of the successive steps of the above-mentioned method.

If one takes however into consideration firstly the mycobacterial cells killed with phenol, there is ob- Table VIII

| Mycobacteria | Products injected | | | Average duration of survival | Survivals >60 days | % of survivors |
|---|---|---|---|---|---|---|
| | Doses | Excipient | J 50% | | | |
| Controls | | | 20 | >21.7 | 1/78 | 1.3 |
| | 10 μg | | >60 | >51.8 | 7/10 | 70 |
| | 30 μg | | >60 | >56 | 9/10 | 90 |
| BCG | 100 μg | sol.isot. | >59 | >51.7 | 23/37 | 62.2 |
| | 300 μg | | >52 | >52.4 | 29/50 | 58 |
| | 1 mg | | 54 | >52.1 | 18/39 | 46.1 |
| | 10 μg | | >60 | >54.7 | 7/10 | 70 |
| | 30 μg | | >60 | >56.5 | 8/10 | 80 |
| M.k. a, | 100 μg | sol.isot. | >60 | >57.7 | 8/10 | 80 |
| ae, c | 300 μg | | >60 | >56.8 | 16/20 | 80 |
| | 1 mg | | >60 | >56.9 | 25/30 | 83.3 |
| | 10 μg | sol.isot. | 20 | >25.7 | 1/10 | 10 |
| | 30 μg | | 44 | >45.8 | 8/19 | 42.1 |
| M.k. | 100 μg | | 47 | >48.2 | 16/40 | 40 |
| par. | 300 μg | | 51 | >48.4 | 23/49 | 46.9 |
| | 1 mg | | 48 | >44.5 | 12/29 | 41.4 |
| | 10 μg | | 40 | >44.6 | 4/10 | 40 |
| | 30 μg | | >60 | >47.8 | 6/10 | 60 |
| M.k. | 100 μg | Bayol | >60 | >55.3 | 13/18 | 72.2 |
| par. | 300 μg | | >60 | >59.1 | 9/10 | 90 |
| | 1 mg | | 51 | >49.9 | 4/10 | 40 |
| | 10 μg | sol.isot. | 19 | 21 | 0/10 | 0 |
| M.k. | 30 μg | | 23 | 26.7 | 0/20 | 0 |
| par.pr. | 100 μg | | 37 | >40.3 | 6/20 | 30 |
| | 300 μg | | 32 | >34.3 | 2/19 | 10.5 |
| | 30 g | Bayol | 26 | 37.4 | 3/9 | 33.3 |
| M.k. | 100 g | | 48 | 47.6 | 3/10 | 30 |
| par.pr. | 300 g | | 60 | 58.6 | 9/10 | 90 | served a considerable antitumoral activity even at extremely low doses. However their toxicity like that of living Mycobacteria remains very high, especially in the case of phenolated cells of BCG.

The products obtained from Mycobacteria by the above-described methods, as shown especially by the pharmacological tests effected with the product extracted from *Mycobacterium kansasii*, bear witness at the same time to a remarkable absence of toxicity and a very considerable antitumoral activity, already at very low dose. Thus M.k, a, ae, c have an activity equal or greater than that of BCG with respect to lymphoid leucemia (Table V) and with respect to EHrlich carcinoma (Table VIII), although the hypertrophy of the spleen is slight with respect to that which is observed with the same doses of BCG (Table III). In the same way, its capacity of sensitizing to endotoxins is at least 200 times less than that of BCG (Table II). The therapeutic index of M.k a, ae, c with respect to that of BCG is hence greater than 200.

The preparations of purified walls, resulting from the rupture of the walls and of the treatment of the latter by proteolytic enzymes, have a reduced toxicity. Those derived from *M. kansasii* are about 200 times less toxic than BCG (Table II). They preserve their antitumoral activity, in spite of these treatments, even if it is reduced by about a half (therapeutic index of about 100). They recover however their full activity when administered in suspension in an emulsion of small amounts of Bayol in water. Their activity becomes then comparable with that of BCG both as regards lymphoid leucemia (Table V) and as regards Ehrlich carcinoma (Table VIII), although at the dose of 100 $\mu$g in the presence of mineral oil they sensitize much less to endotoxins than 100 $\mu$g of BCG even without oil.

Products obtained by treatment of the delipidised broken walls of the abovesaid cells with pronase are of a very particular interest, since they are devoid of any tuberculinic activity. It has in fact been observed that treatment by pronase of the walls of Mycobacteria does not cause the antitumoral activity of the latter to disappear. In this case, the addition of Bayol at very low doses (1 to 10%) considerably reinforces the antitumoral activity of the walls treated with PRONASE (Table VIII).

The invention relates also to the pharmaceutical compositions constituted from sterile suspensions of the products obtained by treatment of cells of dead Mycobacteria or the like by the "four solvents" mentioned above and used in the order indicated, in a pharmaceutically acceptable sterile aqueous medium, free of any oil, enabling the administration of the medicament to laboratory animals, by scarification, by intradermal, subcutaneous or parenteral injection.

The invention relates also more particularly to pharmaceutical compositions constituted by the sterile suspensions of the products obtained by treatment of the broken walls of cells of Mycobacteria or the like, by proteolytic enzymes, especially by chymotrypsin, trypsin and, if necessary, PRONASE, in pharmaceutically acceptable oil emulsions in an aqueous vehicle, also pharmaceutically acceptable, and adapted to enable the administration of the suspensions obtained to laboratory animals by the same routes as indicated above.

Purely by way of indication and in nonlimiting manner, the products according to the invention may be used at doses corresponding for example to those which are respectively obtained from 0.1 to 20 mg, especially from 2 to 10 mg of living cells of Mycobacteria, of Nocardia or the like.

As is self-evident and as emerges already from the foregoing, the invention is in no way limited to those of its types of application and embodiments which have been more especially envisaged; it encompasses, on the contrary, all modifications.

We claim:

1. Method for preparing a non-specific stimulant agent for antitumoral immunity in warm blooded animals, comprising cultivating a strain of micro-organism of the species *Mycobacterium tuberculosis*, var. *hominis* or *bovis*, *Mycobacterium kansasii* or *Mycobacterium smegmatis*, collecting the cells of the cultivated strain, killing said cells then subjecting the dead cells to a first extraction treatment with acetone, followed by extraction treatment with a mixture of absolute alcohol and ether, and collecting the solid residue.

2. Method according to claim 1, including subjecting said cells also to extraction treatment with chloroform.

3. Method according to claim 1 wherein the absolute alcohol and ether are mixed in a proportion by volume equal to 1:1.

4. Method according to claim 1, wherein said micro-organisms are derived from the Pasteur strain of Calmette-Guérin bacilli.

5. Method according to claim 1 wherein said micro-organisms are derived from the strain *Mycobacterium smegmatis* ATCC 21732.

6. Method according to claim 1, wherein said micro-organisms are derived from the strain *Mycobacterium kansasii*.

7. Method according to claim 1, wherein the solid residue obtained, constituted by delipidised cells, is subjected to a treatment of rupturing the walls of said cells, collecting and treating the broken cellular walls with at least one proteolytic enzyme and collecting the solid residue which consitutes the abovesaid stimulant agent.

8. Method according to claim 7, wherein the said broken cellular walls are treated with trypsin, chymotrypsin or both at once, and collecting the solid product obtained which constitutes the abovesaid stimulant agent.

9. Method according to claim 7, wherein the product obtained at the end of the treatment by said proteolytic enzymes is again treated with PRONASE and the solid residue which constitutes the abovesaid stimulant agent is collected.

10. An agent effective as a non-specific stimulant for antitumor immunity in warm blooded animals comprising the solid residue produced by cultivating a strain of micro-organism of the species *Mycobacterium tuberculosis* var. *homis* or *bovis*, *Mycobacterium kansasii* or *Mycobacterium smegmatis*, collecting the cells of the cultivated strain, killing said cells then subjecting dead cells to a first extraction treatment with acetone, followed by extraction with a mixture of absolute alcohol and ether and collecting said residue.

11. An agent effective as a non-specific stimulant for antitumor immunity in warm-blooded animals comprising the solid residue produced by cultivating a strain of micro-organism of the species *Mycobacterium tuberculosis* var. *homis* or *bovis*, *Mycobacterium kansasii* or *Mycobacterium smegmatis*, collecting the cells of the cultivated strain, killing said cells then subjecting dead cells to a first extraction treatment with acetone, followed by extraction with a mixture of absolute alcohol and ether then extraction with chloroform.

12. An agent effective as a non-specific stimulant for antitumor immunity in warm-blooded animals comprising the solid residue as claimed in claim 10 wherein said residue is subjected to a treatment of rupturing the walls of said cells, collecting and treating the broken cellular walls with at least one proteolytic enzyme and collecting the solid residue.

13. An agent effective as a non-specific stimulant for antitumor immunity in warm-blooded animals comprising the solid residue of claim 12 wherein said broken cellular walls are treated with trypsin, chymotrypsin or both at once and collecting the solid residue.

14. An agent effective as a non-specific stimulant for antitumor immunity in warm-blooded animals comprising the solid residue of claim 12 wherein said residue is treated with Pronase and the solid residue collected.

* * * * *